Feb. 6, 1940.  J. W. LEIGHTON  2,188,952
INDIVIDUAL SPRINGING
Filed Jan. 14, 1938   2 Sheets-Sheet 1
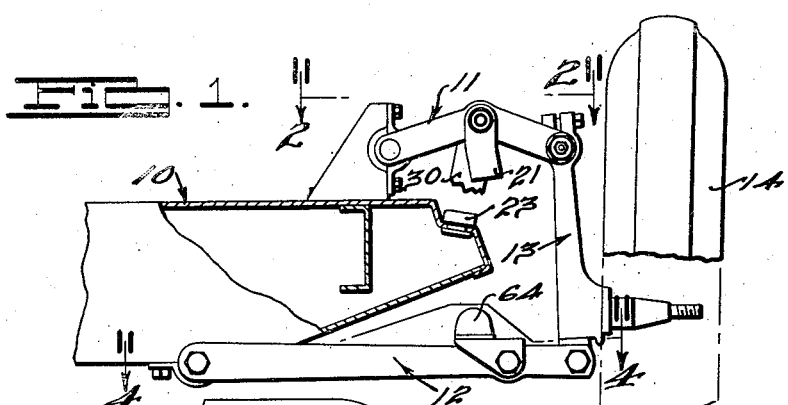
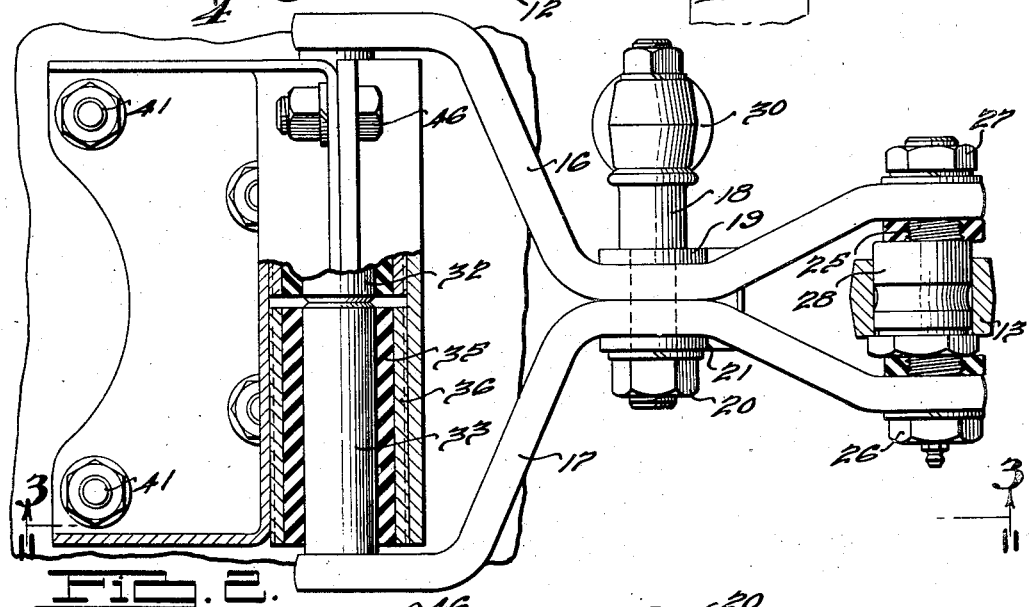
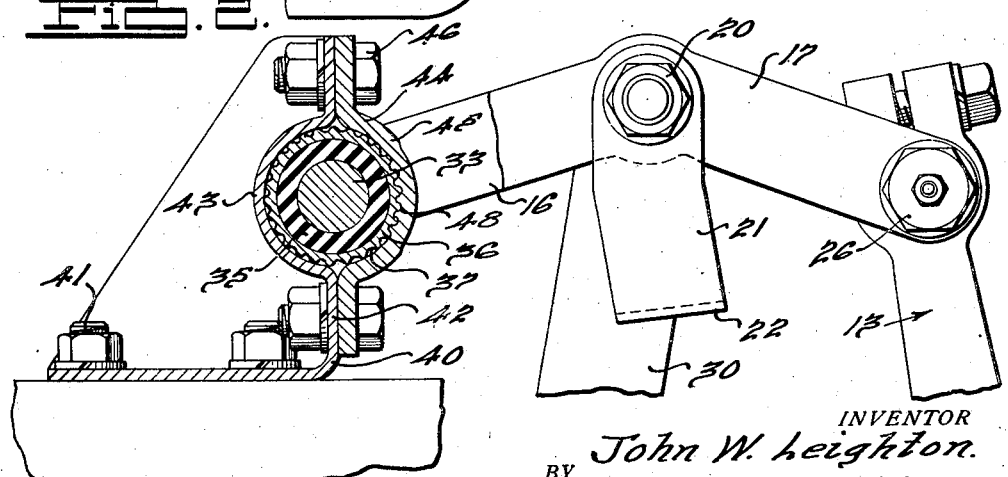
INVENTOR
John W. Leighton.
BY Harness, Dickey & Pierce.
ATTORNEYS.

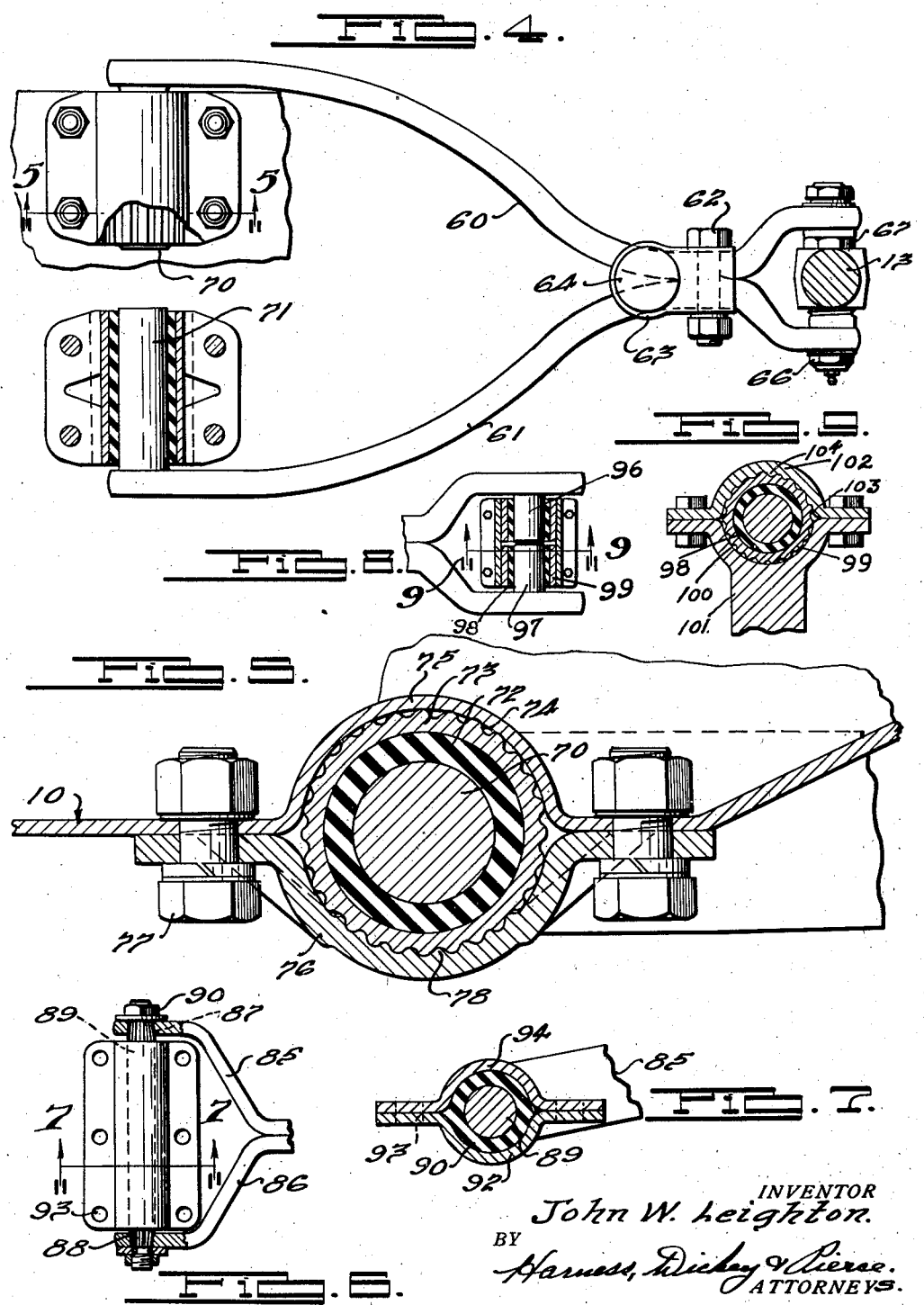

Patented Feb. 6, 1940

2,188,952

UNITED STATES PATENT OFFICE 2,188,952

INDIVIDUAL SPRINGING

John W. Leighton, Port Huron, Mich.

Application January 14, 1938, Serial No. 184,961

4 Claims. (Cl. 267—20)

The invention relates to motor vehicles and it has particular relation to individual springing for the wheels of such vehicles.

It is more or less conventional to use at the present time an individual springing including upper and lower arms pivoted on the frame and supporting at their outer ends a wheel mounting member. Ordinarily in this type of spring a coil spring is disposed between a portion of the frame and the lower arm. While the present invention, or at least parts thereof, may have a more general application, it is particularly concerned with this type of springing.

One object of the present invention is to provide individual springing of the general character indicated wherein instead of using coil springs, rubber under torsion is employed for resiliently connecting at least one of the arms to the frame.

Another object of the invention is to provide an improved arrangement of this general character wherein improved means are provided for enabling an adjustment of the torsion on the rubber.

Another object of the invention is to provide an arrangement of the general character indicated, which is simple and inexpensive to manufacture and which is capable of installation and adjustment without requiring much time or effort.

Another object of the invention is to provide a torsional joint of improved character which may be manufactured inexpensively and applied easily.

Another object of the invention is to provide improved individual springing wherein rubber under torsion or tension is employed for connecting at least the outer end of one arm to the wheel mounting member.

Other objects of the invention will become apparent from the following specification, from the drawings to which it relates, and from the claims hereinafter set forth.

For a better understanding of the invention, reference may be had to the drawings wherein:

Figure 1 is a fragmentary elevational view showing a vehicle frame and individual springing constructed according to one form of the invention;

Fig. 2 is a cross-sectional view on a larger scale with certain parts broken away, taken substantially along the line 2—2 of Fig. 1;

Fig. 3 is a cross-sectional view taken substantially along the line 3—3 of Fig. 2;

Fig. 4 is a cross-sectional view on a larger scale taken substantially along the line 4—4 of Fig. 1;

Fig. 5 is a cross-sectional view on a larger scale taken substantially along the line 5—5 of Fig. 4;

Fig. 6 is a fragmentary view of another arrangement for connecting the inner ends of the arms to the frame; and Fig. 7 is a cross-sectional view taken substantially along the line 7—7 of Fig. 6;

Fig. 8 is a fragmentary view illustrating a rubber connection between the outer end of either arm and the wheel mounting member; and Fig. 9 is a cross-sectional view on a larger scale taken substantially along the line 9—9 of Fig. 8.

Referring to Fig. 1, the frame of the vehicle is indicated at 10, the upper arm of the individual springing at 11, the lower arm of such springing at 12, the wheel mounting member at 13, and the wheel at 14. These arms are pivotally connected to the frame for vertical pivotal movement and the axes of such pivotal movement are parallel and generally along the frame. It will be noted that the upper arm is shorter than the lower arm.

Now referring to Figs. 2 and 3, which relate to the upper arm, this arm comprises two members 16 and 17 having intermediate abutting portions connected by means of a pin 18 having a shoulder 19 abutting one side and a nut 20 at the other side for locking the arm members together. Between the nut 20 and the arm 17, a bracket member 21 is provided which has an angled lower portion 22. This serves as a bumper member. This bumper member is adapted to engage a bumper 23 on the frame so as to limit upward movement of the frame. At their outer ends, the arm members 16 and 17 diverge and a threaded pin 25 is threaded through openings in such end and is held in position by means of a head 26 on one end and a nut 27 on the other end. This pin intermediate its ends may have an eccentric portion 28 connected to the apertured upper end of the wheel mounting member 13. It may be added that the pin 18 also may serve as the upper connection for a shock absorber 30, which at its lower end may be connected to the frame.

The arm members 16 and 17 at their inner ends terminate in trunnion portions 32 and 33 projecting towards each other and substantially abutting. Each of these trunnions is disposed in a sleeve 35 of rubber and the rubber in turn is disposed in a metal sleeve 36 having axially extending corrugations 37 on its outer surface. The trunnion, rubber sleeve, and metal sleeve 36 are positively interconnected by bonding or vulcanization of the rubber and various processes for vulcanizing rubber to such metal parts may be used, as will be recognized by those skilled in the art.

For mounting the metal sleeve 36 on the frame, a sheet metal bracket 40, bolted to the frame as indicated at 41, has an upwardly extending portion 42 provided with a depression 43 for receiving the metal sleeve 36. A second bracket 44, corresponding in shape to the upwardly projecting part 42 of bracket 40, similarly has a depressed portion 45, which jointly with the depressed portion 43 provide a cylindrical opening for the metal sleeve. Such bracket elements are connected together by means of bolts 46 passing through openings at either side of the opening. It will be noted that the bracket 44 is formed with a number of axial corrugations 48 that are disposed over a substantial circumferential portion of its inner periphery and these corrugations interlock with corrugations 37 on the metal sleeve 36. It will be readily appreciated from this that if the bracket 44 is removed, the metal sleeve may be turned circumferentially to a new position and then locked in this new position by again fastening the bracket 44 in place.

Now referring to Figs. 4 and 5, the lower arm 12 comprises arm members 60 and 61 that are bolted together adjacent their outer ends, as indicated at 62. A bracket element 63 may be fastened to the arm by means of the bolt 62 to serve as a bumper element and may have a rubber bumper 64, as shown by Fig. 1, for engagement with a part of the frame 10, so as to limit downward movement of the latter. Beyond the bolt 62, the arm members 60 and 61 diverge and their outer ends are connected by means of a bolt 66 threaded through openings in such ends. This bolt intermediate its ends is connected to the lower end of the mounting member 13 by providing an eye portion on the latter and if desired a bushing 67 may be threaded on the pin and into the opening in such eye portion.

The arm members 60 and 61 at their inner ends terminate in trunnions 70 and 71 that are directed toward each other and each of these trunnions is pivotally connected to the frame by means of like mountings. Each of these mountings comprises a rubber sleeve 72 bonded to the trunnion and to a metal sleeve 73 provided with axial corrugations 74. The metal sleeve is disposed in a depressed portion 75 of frame 10, forming substantially one half of a cylindrical recess, and a bracket 76, similarly shaped as the depressed portion 75, forms the remainder of the recess for receiving the sleeve 73. The bracket 76 is connected to the frame 10 by means of bolts 77. As previously described in connection with Fig. 3, the metal sleeve 73 has a number of axial corrugations 78 on its inner surface adapted to engage certain of the corrugations 74 and thus lock the metal sleeve 73 against rotation. By removing the bracket 76, the sleeve 73 can be turned to a new position and then locked in such new position by reapplying the bracket.

It will be observed that no coil spring is provided between the frame and the lower arm as may usually be found in this general type of springing. The use of the coil spring is avoided by employing rubber sleeves as torsional springs which are under tension. It will be appreciated that by turning the metal sleeves bonded to the rubber sleeves relative to the trunnions on the arms, the rubber can be placed on the desired condition of tension and then the metal sleeve may be locked in the adjusted position. It is apparent, for example, that the releasable bracket having the corrugations may be removed and then the frame may be lifted, and this will cause the metal sleeve, rubber, and trunnions, to turn about the axis of pivotal movement since in raising the frame the arms will become angled downwardly and outwardly. With the frame in a raised position, the brackets again may be applied so as to lock the metal sleeves in position and then when the frame is released, the load is taken through torsion or tension of the rubber circumferentially. It of course is apparent that either torsional connection may be adjusted separately before the parts are assembled with the wheel and wheel mounting member. In any event, the separable bracket having the corrugations and the metal sleeve having the corrugations provides a means for initially obtaining a relation which results in the rubber being under tension when the load of the frame is on the arms and also that the corrugated elements provide a means for readily making adjustments whenever increased tension in the rubber is necessitated.

Attention may be directed to the fact that the assembly may be easily manufactured, assembled, and adjusted, and this is particularly important because the cost of using springing of this character is therefore lowered accordingly. Each of the arms is of such character that the trunnions thereon may be formed by upsetting or forging operations and other parts can be manufactured simply such as by stamping or shaping of sheet metal. Each arm may be assembled with its rubber sleeve and metal sleeve and then the assembly disposed in the recessed portions of the frame, following which the corrugated brackets may be fastened to the frame to lock the parts in position.

While rubber torsional springs with the rubber under tension are shown as employed in connection with both the upper and lower arms, it may be preferable to use such springs only in connection with the upper arm and it is evident that sufficient torsion may be used to take the load at each wheel. It is preferable to use the torsional spring in connection with the upper arm inasmuch as the upper arm is shorter and a greater angle of turning occurs, from which it follows that greater torsion of the rubber results during ordinary up and down movement of the frame. Moreover, by using the rubber springs in connection with the upper arm only, a simplified inexpensive lowering arm may be used since in this event the lower arm would constitute substantially only a guiding means for guiding the lower end of the wheel mounting member. Such lower arm in this case could be manufactured from small bar stock and since this lower arm is longer, the use of smaller bar stock decreases the expense even more because of the greater length of the arm.

Referring to Figs. 6 and 7, instead of using the corrugated metal sleeve and corrugated bracket, either arm might be connected to the frame in the following manner. Arm members 85 and 86, which may correspond generally to the arm members of either the upper or lower arms, have, instead of trunnions at their inner ends, tapered openings 87 receiving tapered serrated portions 88 on the ends of a pivot bolt 89. Both the opening in the arm and the end of the bolt may be serrated, if desired, and the outer ends of the bolt are threaded to receive nuts 90 for forcing the arms over the serrated portions so as to lock such arms positively in place and against relative turning with respect to the bolt. It will be appreciated, however, that by removing the arms or at least loosening them sufficiently, the bolt and arms may be turned relatively and then tightly connected in their new positions.

As shown best by Fig. 7, the bolt 89 has a rubber sleeve 94 around it and this rubber sleeve is received by two stampings 91 and 92 that have apertured flange portions 93 for fastening the stampings to the vehicle frame. The bolt 89, sleeve 94, and stampings are vulcanized together so that a strong vulcanized bond is obtained between the rubber and the stampings and the bolt. This arrangement provides a torsional spring as will be evident from prior discussions, and the serrated ends of the bolt permit relative turning adjustment of the arm with respect thereto so as to obtain the tension or torsion condition in the rubber desired. The arrangement illustrated is exceedingly simple and inexpensive to manufacture and thus the cost of using this type of construction is low.

While the foregoing has dealt with mountings for the inner ends of the arms, it is to be understood that such rubber torsional springs may be used also at the outer ends of the arms. Figs. 8 and 9 show a mounting at the outer end of one arm and this may be applied to one or both arms. In this case, the arm members, for example arm members 16 and 17, have trunnion portions 96 and 97, each of which receives a rubber sleeve 98 and the latter in turn is received by a corrugated metal sleeve 99. It will be understood that the rubber is bonded by vulcanization to both the trunnion and metal sleeve. Both metal sleeves are disposed in a semi-cylindrical recess 100 in the wheel mounting member, indicated at 101, and it will be understood that the latter corresponds to the wheel mounting member 13. For holding the sleeves in the recess and adjustably locking them against turning relative to the wheel mounting member, a bracket 102 is bolted to the mounting member and this bracket has a recess 103 provided with corrugations 104 for interlocking with corrugations of the metal sleeves. In general, therefore, the arrangement is like the mounting shown at the inner end of the arms in Fig. 2 and adjustment of tension or torsion may be made in a similar manner.

In the different figures of the drawings, tubular means are provided for receiving the arm trunnions and such means are formed of partially cylindrical members or brackets and in one instance, a partial recess is formed by a depression in the vehicle frame. This general subject matter is embodied and claimed in my copending application Serial No. 176,088, filed November 23, 1937.

Although more than one form of the invention has been described and illustrated in detail, it will be apparent to those skilled in the art that various modifications may be made without departing from the scope of the appended claims.

What is claimed is:

1. In combination, a motor vehicle frame, upper and lower arms projecting laterally from the frame and pivotally connected thereto for pivotal movement in a substantially vertical plane about an axis extending longitudinally of the frame and wheel mounting means between the outer ends of the arms, the pivotal connection between one of the arms and the frame comprising a tubular member on the frame, a shaft member on the arm and projecting into the tubular member in radially spaced relation thereto, a rubber sleeve between the tubular member and shaft member and bonded to both members, tubular means on the frame and receiving the tubular member and including a releasable section, and coacting ridges and grooves on the member and section normally holding the member against turning in the tubular means but allowing turning thereof when the section is released and also allowing application of the section to hold the member in its new position of adjustment, said rubber being normally under torsion when the frame is supported by the wheel and providing a spring between the frame and arm.

2. In combination, a motor vehicle frame, upper and lower arms projecting laterally from the frame and pivotally connected thereto for pivotal movement in a substantially vertical plane about an axis extending longitudinally of the frame and wheel mounting means between the outer ends of the arms, the pivotal connection between one of the arms and the frame comprising, a tubular member on the frame, a shaft member on the arm and projecting into the tubular member in radially spaced relation thereto, a rubber sleeve between the tubular member and shaft member and bonded to both members, tubular means on the frame and comprising a depression in a portion of the frame and a sheet metal section releasably fastened to the frame and jointly with the depressed portion providing a bore for receiving the tubular member, means including projections and recesses on the tubular member and releasable section for normally holding the tubular member against turning but permitting turning thereof when the section is released and allowing application of the section to hold the member in its new position of adjustment, said rubber normally being under torsion when the frame is supported by the wheel and providing a spring between the frame and arm.

3. In an oscillatory joint, a torsional connection comprising a pair of members adapted to have relative oscillatory movement, one having an opening and the other having a shaft portion projecting thereinto in radially spaced relation, a rubber sleeve between the shaft portion and wall of the opening and locked thereto, tubular means embracing the first member and adapted to connect it to a support and including a releasable section, and means on the releasable section and on the first member for normally locking the means and member against relative turning but allowing circumferential adjustment when the section is released.

4. In combination, a motor vehicle frame, upper and lower arms projecting laterally from the frame, means pivotally connecting the arms to the frame, and wheel mounting means between the outer ends of the arms and pivotally connected thereto, the pivotal connection between the wheel mounting member and one of the arms comprising a trunnion portion on the arm, rubber around the trunnion and bonded thereto, a metal sleeve around the rubber and bonded thereto and having axial corrugations on its outer periphery, a recessed portion on the end of the mounting and receiving the metal sleeve, a recessed plate releasably fastened to the wheel mounting member and jointly with the recessed portion of the wheel mounting member providing a recess for the metal sleeve, and corrugations on the plate and engaging certain of the corrugations on the metal sleeve.

JOHN W. LEIGHTON.